United States Patent
Chang et al.

[11] Patent Number: 5,995,919
[45] Date of Patent: Nov. 30, 1999

[54] MULTI-LINGUAL RECOGNIZING METHOD USING CONTEXT INFORMATION

[75] Inventors: Jackson Chang; Chaucer Chiu, both of Taipei, Taiwan; Grant Yang, Shanghai, China

[73] Assignee: Inventec Corporation, Taipei, Taiwan

[21] Appl. No.: 08/899,890

[22] Filed: Jul. 24, 1997

[51] Int. Cl.$^6$ ................................................ G06F 17/28
[52] U.S. Cl. ................................................ 704/8
[58] Field of Search ................... 704/8, 9, 251, 704/257, 2

[56] References Cited

U.S. PATENT DOCUMENTS

| | | | |
|---|---|---|---|
| 4,736,296 | 4/1988 | Katayama et al. | 704/8 |
| 4,829,580 | 5/1989 | Church | 704/9 |
| 4,870,402 | 9/1989 | DeLuca et al. | 704/8 |
| 5,157,606 | 10/1992 | Nagashima | 704/8 |
| 5,384,701 | 1/1995 | Stentiford et al. | 704/3 |
| 5,634,134 | 5/1997 | Kumai et al. | 704/8 |
| 5,787,452 | 7/1998 | McKenna | 704/8 |

*Primary Examiner*—David R. Hudspeth
*Assistant Examiner*—Martin Lerner
*Attorney, Agent, or Firm*—Sughrue, Mion, Zinn, Macpeak & Seas, PLLC

[57] ABSTRACT

An automatic multi-lingual recognizing method for distinguishing multi-lingual characters among different codes is disclosed. The method includes determining the code legitimacy of characters of a whole text by comparing code blocks of the characters with predefined code ranges of code systems. Next, if the code legitimacy of the characters is not uniquely recognized, the characters of the whole text is analyzed to determine whether the characters are common phrases by comparing the characters with common-phrase data bases. Finally, if the analysis of the common phrase of the characters is not uniquely recognized, the characters of the text is then analyzed to determine whether the characters are common words by comparing the characters with common-word data bases.

13 Claims, 9 Drawing Sheets

Korean

Dr.eye두언어시스템은 현재 가장 새롭고 특색 있는 영한/한영두언어 전환 및 처리하는 소프트웨어입니다.
　　<두언어사전>, <컴퓨터말음>, <다국어찾아보기>, <자동 낱말작성>등 최신 기능 외에 dr.eye 두언어시스템은 전세계에서 가장우월한 기능 - - - 닥터아이-쾌속번역 기능을 통해서 인트넷 문장을 읽을 때, 즉시 해독의 기쁨을 얻을 수 있습니다.

Chinese(Big5)

Dr.eye雙語平台是目前最新最有特色的一種英漢／漢英雙語轉換與處理的軟體．除了"雙語辭典"、雙語合成發音、"多國語瀏覽"、"免查生字"等最新功能外，Dr.eye雙語平台還具有當今世界上最有突破性的功能———"博士眼-快速翻譯"

Japanese

ドクター・アイ バイリンガル プラットフォームは、とても使いやすい英中／中英相互翻訳処理ソフトウェアです。ドクター・アイ バイリンガル プラットフォームは、"バイリンガル辞書"、"バイリンガル合成音"、"多国語参照"、"単語オート 検索"等の最新の機能の他に、高機能翻訳システム"

Chinese(GB2312)

Dr.eye双语平台是目前最新最有特色的一种英汉／汉英双语转换与处理的软体．除了"双语辞典"、双语合成发音、"多国语浏览"、"免查生字"等最新功能外，Dr.eye双语平台还具有当今世界上最有突破性的功能———"博士眼-快速翻译"

FIG. 7

MULTI-LINGUAL RECOGNIZING METHOD USING CONTEXT INFORMATION

BACKGROUND OF THE INVENTION

1. Field of the Invention

The present invention relates to an automatic lingual recognizing method, and particularly, to an automatic multi-lingual recognizing method for distinguishing multi-lingual characters among different code systems.

2. Description of the Prior Art

Window-based softwares, such as Microsoft Windows, are widely used in modem computers, such as IBM personal computers or IBM compatibles. However, for those non-English window-based softwares (referred to as windows hereinafter), each kind of the windows uses its proprietary code to generate the corresponding characters displayed on the screen. For example, Big 5 code is used in Taiwanese windows, GB 2312 code in (Mainland) Chinese windows, Shift-Jis code in Japanese windows, and KSC-5601 in Korean windows. Due to the incompatibility among these non-English windows, a multi-lingual browser, which is usually construed under a window-based operating system, is used to facilitate readers in a multi-lingual circumstance, such as the internet. However, users of the multi-lingual browsers should firstly select a specific code so that the characters the users want to read can be correctly shown. For example, under Microsoft's Win 95 of Taiwanese edition, users can recognize paragraphs construed in GB 2312 code by firstly selecting GB 2312 in a conventional multi-lingual browser. Unfortunately, the original displayed characters, which are construed in Big 5 code, on, for example, a title bar or pop-up menu, become no longer recognizable after GB 2312 is selected.

It is further inconvenient for readers to read paragraphs with more than one kind of language by repeatedly switching among different codes (or code systems). Moreover, the conventional multi-lingual browsers do not allow readers to correctly read a line or a paragraph construed in more than one kind of code.

SUMMARY OF THE INVENTION

In accordance with the present invention, the purpose of the present invention is to provide an automatic multi-lingual recognizing method for distinguishing multi-lingual characters among different codes by using contextual information, so that characters with different codes can be simultaneously and correspondingly shown.

Another purpose of the present invention is to provide a method for automatically recognizing the category of a code by analyzing contextual information. Therefore, characters construed in multiple codes can be shown at the same time, compared with the conventional multi-lingual browsers that can only show one kind of code at one time, and may even cause unrecognizable characters on originally displayed windows.

In accordance with the present invention, a method is provided for automatically recognizing codes of multi-lingual characters, and correctly displaying the multi-lingual characters. In one embodiment, the code legitimacy of characters of a whole text is firstly determined by comparing code blocks of the characters with predefined code ranges of code systems. Next, if the code legitimacy of the characters is not uniquely recognized, the characters of the whole text is analyzed to determine whether the characters are common phrases by comparing the characters with common-phase data bases. If the analysis of the common phrase of the characters is not uniquely recognized, the characters of the text is then analyzed to determine whether the characters are common words by comparing the characters with common-word data bases.

Thereafter, if the whole text is still not uniquely recognized through the above analysis, the code legitimacy of a present-position character is then determined by comparing code block of the present-position character with predefined code ranges of the code systems. If the code legitimacy of the present-position character is not uniquely recognized, the present-position character and at least one character thereafter is then analyzed to determine whether the present-position character and the character thereafter are common phrases by comparing those characters with the common-phrase data bases. Finally, if the analysis of the common phrase of the present-position character is still not uniquely recognized, the present-position character is analyzed to determine whether the present-position character is a common word by comparing the present-position character with the common-word data bases.

BRIEF DESCRIPTION OF THE DRAWINGS

FIG. 7 shows one example of the recognized multi-lingual article, which contains Korean, Chinese (in Big 5), Japanese, and Chinese (in GB 2312).

DESCRIPTION OF THE PREFERRED EMBODIMENT

Figure 1:
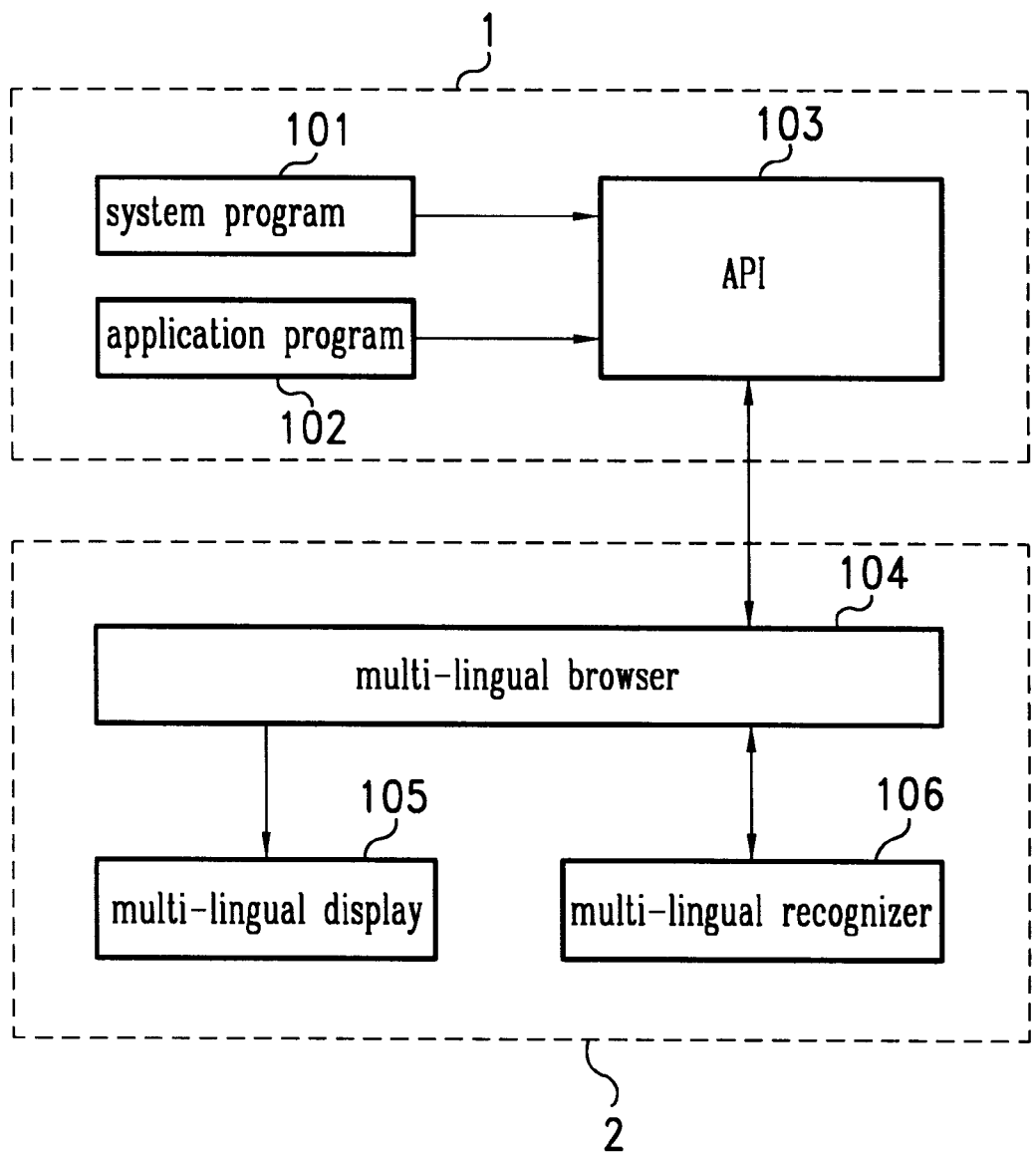
FIG. 1 shows a functional block diagram according to one embodiment of the present invention.

The present invention uses contextual analyzing method to automatically recognize the code (or code system) pertinent to displayed characters. Big 5 (Taiwan), GB 2312 (Mainland China), Shift-Jis (Japan) and KSC-5601 (Korea) are used in this embodiment. However, it is appreciated, in light of this disclosure, that other codes can be adapted to the present invention without undue experimentation by those skilled in the art.

It is found that there are some overlaps among code ranges defined by different codes. TABLE 1 below illustrates the code ranges defined for each code mentioned above, in which each defined character is composed of code block having two bytes, i.e. the first byte and the second byte.

TABLE 1

| Code | first byte | second byte |
| --- | --- | --- |
| Big 5 | 0xA1–0xF9 | 0x40–0x7E |
| | | 0xA1–0xFE |

TABLE 1-continued

| Code | first byte | second byte |
| --- | --- | --- |
| GB 2312 | 0xA1–0xF7 | 0xA1–0xFE |
| Shift-Jis | 0x81–0x84 | 0x40–0x7E |
|  | 0x88–0x9F | 0xA1–0xFE |
|  | 0xE0–0xEA |  |
| KSC-5601 | 0xA1–0xFE | 0xA1–0xFE |

The non-overlapped portion of the code range is thus used to analyze a group of characters having two or more characters, thereby increasing the possibility in correctly recognizing a character. For example, the compositional code block of the character "成" (cheng) in Big 5 code is (0xA6, 0xA8), which is unfortunately also defined in GB 2312 code and KSC-5601 code. Therefore, this character "成" (cheng) can not be individually recognized. However, when concerning its contextual information, i.e., the character or characters before or after this deciding character, a group consisting of more than two characters may be isolated (or recognized) out by their contextual information. For example, if the aforementioned character "成" (cheng) is followed by another character "功"(kung), where the combined "成功" (cheng kung) means success, the compositional code blocks together become (0xA6, 0xA8), (0xA5, 0x5C). It is found, from investigating TABLE 1, that the compositional code (0xA5, 0x5C) representative of the character "功" (kung) is unique as one compositional code block in Big 5 code. This contextual analysis is called contextual analysis of code legitimacy in this embodiment.

The overlap of a single character between Big 5 code and GB 2312 code is about 59.8%. However, the overlap of a group of ten characters becomes about 0.5% (i.e., $0.598^{10}$), thereby increasing the possibility in correctly recognizing the characters in Big 5 code. Also, distinction between Big 5 code and KSC-5601 code is large because of their small overlap. Moreover, recognition of Shift-Jis code is quite possible because of its small overlap with any of other codes (i.e., Big 5, GB 2312 and KSC-5601 in this embodiment). Generally, the smaller overlap the codes have, the more possibly the characters are correctly recognized using the contextual analysis of code legitimacy.

Owing to the fact that GB 2312 and KSC-5601 uses almost the same code range (i.e., almost overlap between them) as can been seen from TABLE 1, it becomes difficult to suitably distinguish between them. Another method, which is referred to as contextual analysis of common phrase according to the present invention, is employed to overcome the problem mentioned above. For example, the compositional code blocks of "成功" (cheng kung) in GB 2312 are (0xB3, 0xC9), (0xB9, 0xA6), which are also defined in Big 5 and KSC-5601. However, concerning the meaning of the phrase represented by the same compositional code in each other code (i.e., GB 2312, Big 5 or KSC-5601), the combined compositional code blocks (0xB3, 0xC9), (0xB9, 0xA6) are only meaningful in GB 2312 as a common phrase "成功" (cheng kung), which means success. On the contrary, the combined compositional code blocks (0xB3, 0xC9), (0xB9, 0xA6) do not construe a common phrase in Big 5 or KSC-5601. In applying the contextual analysis of common phrase, the frequency and their order of the common phrases for each code are statistically analyzed according to a corresponding stored common-phrase data base. TABLE 2 below demonstrates a portion of the common-phrase data base used in Taiwan. Each entry in this data base has a count that represents its occurring frequency. It is appreciated that other common-phrase data base according to other language, such as Korean, Japanese or Chinese) can be appropriately construed in a similar manner.

TABLE 2

| record | phrase |
| --- | --- |
| record 0 | ＿＿ ＿＿ (ii, which means each one) |
| record 1 | ＿＿ 一下(i hsia, which means once) |
| record 2 | ＿＿ 一口(i kou, which means a bite) |
| record 3 | ＿＿ 一千(i chien, which means one thousand) |
| record 4 | ＿＿ 一切(i chieh, which means everything) |
| record 5 | ＿＿ 一心(i hsin, which means mind) |
| record 6 | ＿＿ 一手(i shou, which means single-handedly) |
| record 7 | ＿＿ 一方(i fang, which means a party) |
| record 8 | ＿＿ 一月(i yueh, which means one month) |
| record 9 | ＿＿ 一旦(i tan, which means whenever) |

Most characters can be recognized through the contextual analysis of code legitimacy, and the contextual analysis of common phrase. However, some multi-lingual paragraph may still not be recognized due to the lack of contextual information because of a short paragraph provided, or a limited common-phrase data base. Another method, which is referred to as contextual analysis of common word (or character) according to the present invention, is employed to overcome this problem. In applying the contextual analysis of common word, the frequency of the common words for each code are statistically analyzed according to corresponding stored common-word data base. Each entry in this data base has a count that represents its occurring frequency. For example, a common-word data base having about three thousand words in GB 2312 can suitably cover more than 99.5% of a common article. TABLE 3 below shows the covering code ranges according to the corresponding common-word data base.

TABLE 3

| code | first byte | second byte |
| --- | --- | --- |
| Big 5 | 0xA4–0xC5 | 0x40–0x7E |
|  |  | 0xA1–0xFE |
| GB2312 | 0xB0–0xD7 | 0xA1–0xFE |
| Shift-Jis | 0x82–0x83 | 0x40–0x7E |
|  |  | 0xA1–0xFE |
| KSC-5601 | 0xB0–0xFE | 0xA1–0xFE |

FIG. 1 shows a functional block diagram according to one embodiment of the present invention. It includes a window-based operating system 1, and a multi-lingual browser 2. In this embodiment, a Microsoft's MS Windows is used as the window-based operating system 1, which is interchangeably referred to as window in the following discussion. Under the window circumstance, an application program interface (API) 103 in the kernel of the window is called whenever displaying character or characters is inquired by a system program 101 or an application program 102. The word "call" used in this disclosure has its conventional meaning in the software art to refer to the control transfer from a system program to a subroutine or a function, which resides inside or outside of the system program. Multi-lingual characters (including English words) are then transferred to a multi-lingual browser 104. After analyzing those characters by a multi-lingual recognizer 106, the English words are sent by the multi-lingual browser 104 back to the API 103, and are then displayed. The non-English characters are sent to the multi-lingual display 105, and are displayed according to the pertinent kind of code recognized in the multi-lingual recognizer 106.

Figure 2:
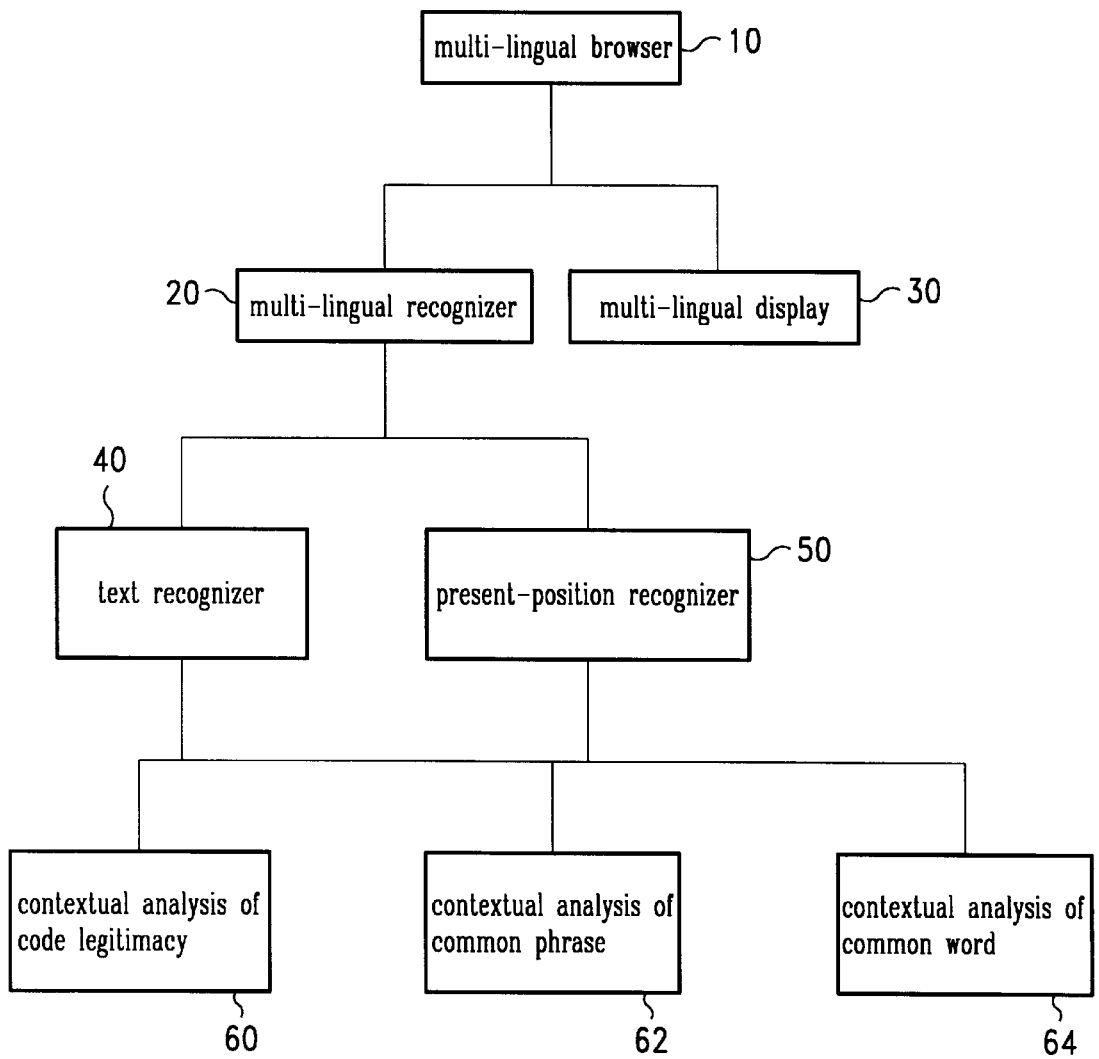
FIG. 2 illustrates a hierarchical model according to the embodiment of the present invention.

FIG. 2 illustrates a hierarchical model according to the embodiment of the present invention. A multi-lingual browser 10 receives multi-lingual characters, which are then fed to a multi-lingual recognizer 20. Those multi-lingual characters analyzed by the multi-lingual recognizer 20 are displayed through a multi-lingual display 30. The multi-lingual recognizer 20 calls a text recognizer 40 or a present-position recognizer 50 to recognize the characters according to the aforementioned contextual analysis of code legitimacy 60, the contextual analysis of common phrase 62, the contextual analysis of common word 64, or their combination.

Figure 3:
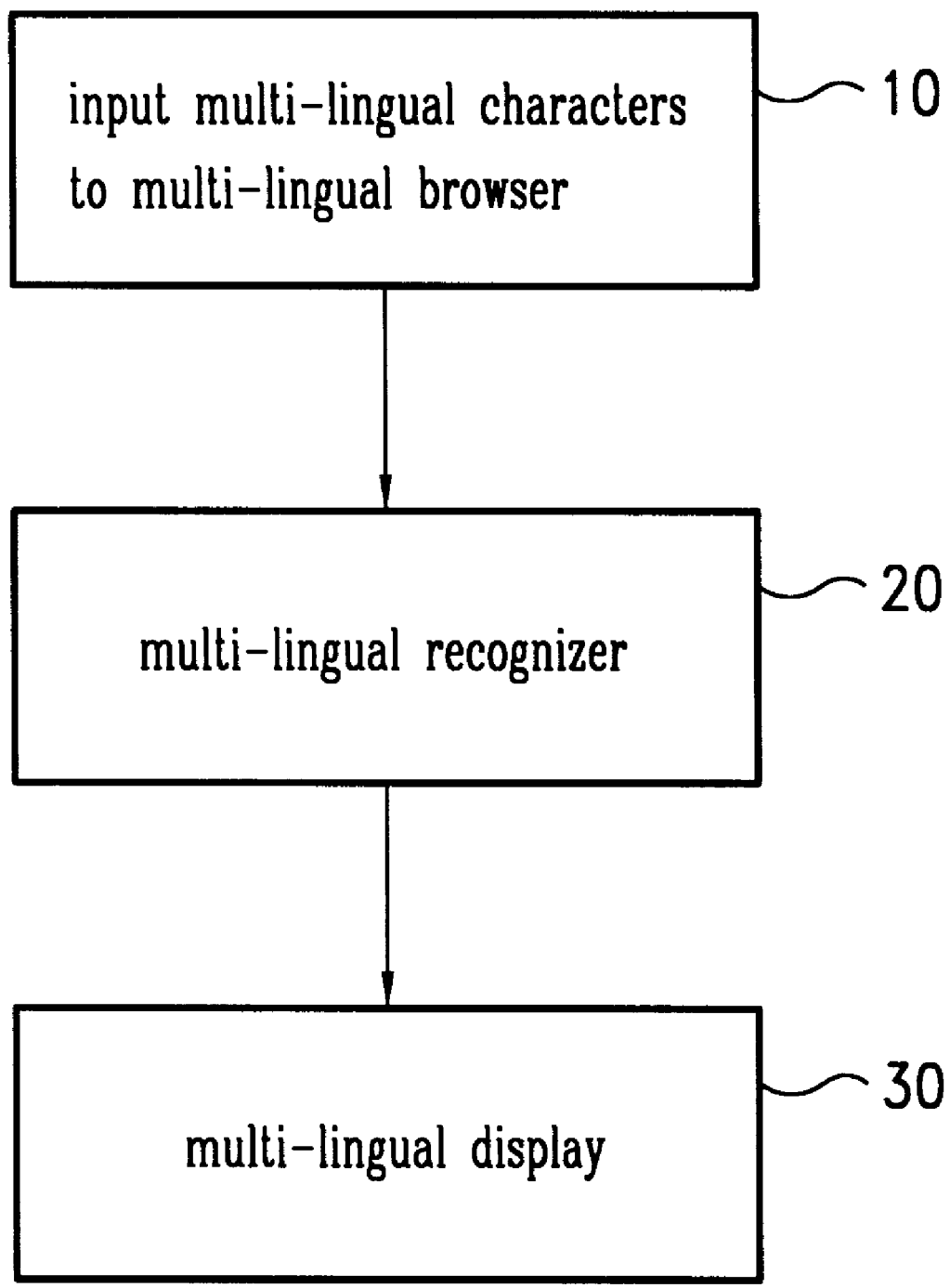
FIG. 3 shows a diagram illustrating the flow of the multi-lingual browse, the multi-lingual recognizer and the multi-lingual display of FIG. 2.

FIG. 3 shows a diagram illustrating the flow of the multi-lingual browser 10, the multi-lingual recognizer 20 and the multi-lingual display 30 of FIG. 2. After the multi-lingual browser 10 receives the multi-lingual characters, the multi-lingual browse 10 calls the multi-lingual recognizer 20 to analyze them. Finally, characters are suitably displayed according to their pertinent recognized code via the multi-lingual display 30.

Figure 4:
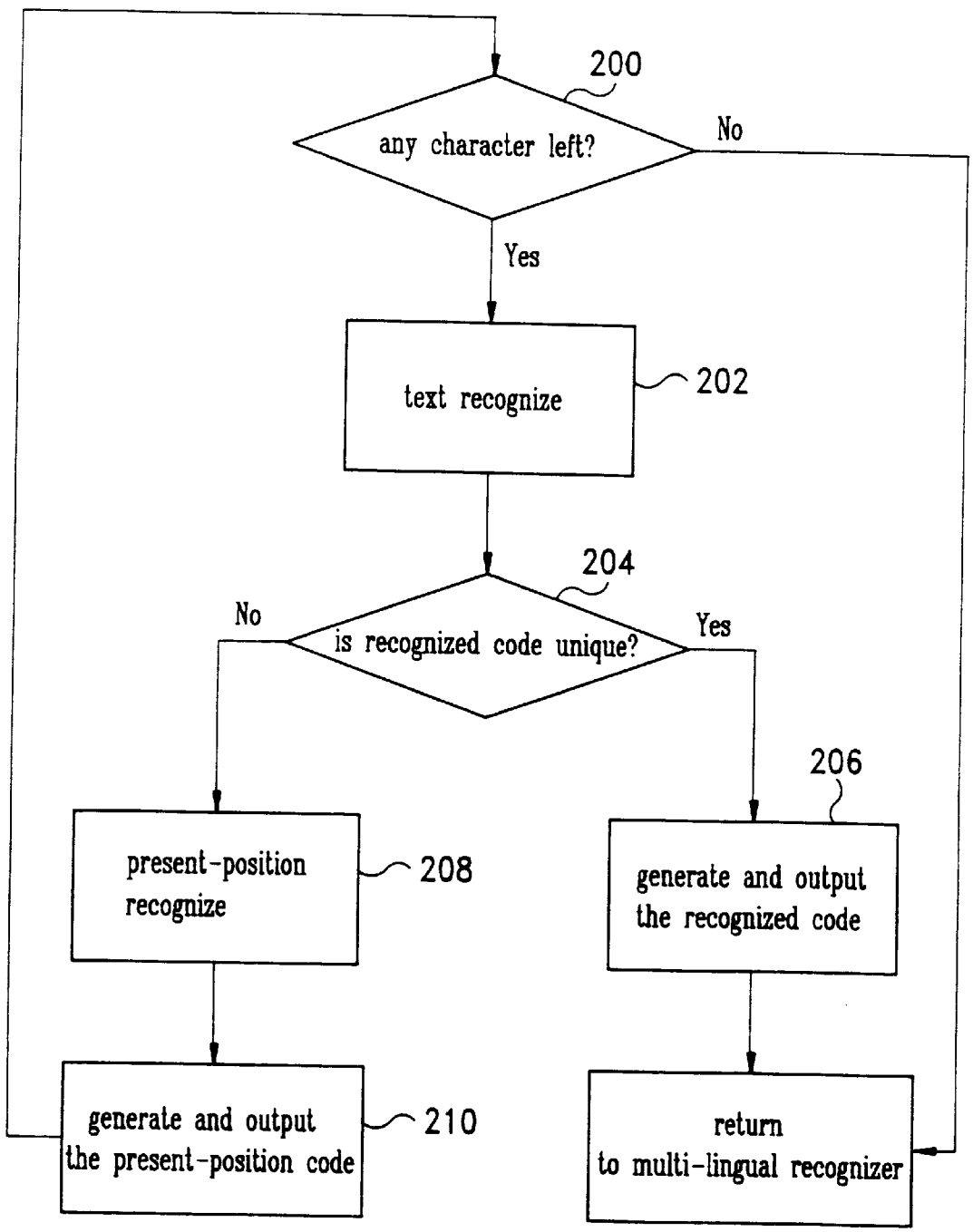
FIG. 4 shows a diagram illustrating the flow of the multi-lingual recognizer, the text recognizer and the present-position recognizer.

FIG. 4 shows a diagram illustrating the flow of the multi-lingual recognizer 20, the text recognizer 40 and the present-position recognizer 50. In step 200, the multi-lingual recognizer 20 determines whether any character is still left to be processed. If no character is left to be recognized, the flow returns to the multi-lingual recognizer 20. On the contrary, if character or characters are still left, the text recognizer 40 receives and processes (in step 202) these characters, wherein the detailed process concerning the text recognizer 40 will be described later in connection with FIGS. 5A and 5B. Next, the result obtained from the step 202 is further analyzed in step 204 to determine whether the recognized code is unique. If the recognized code is unique, i.e., only one code is recognized, this unique category of code pertinent to the character or characters is generated and output (in step 206), followed by returning to the multi-lingual recognizer 20. However, if the recognized code is not unique, the present-position recognizer 50 is applied (in step 208), where the detailed process concerning the present-position recognizer 50 will be described later in connection with FIGS. 6A and 6B. Next, the category of code pertinent to the present-position character is generated and output, followed by returning to the step 200 for continuously processing other characters.

Figure 5A:
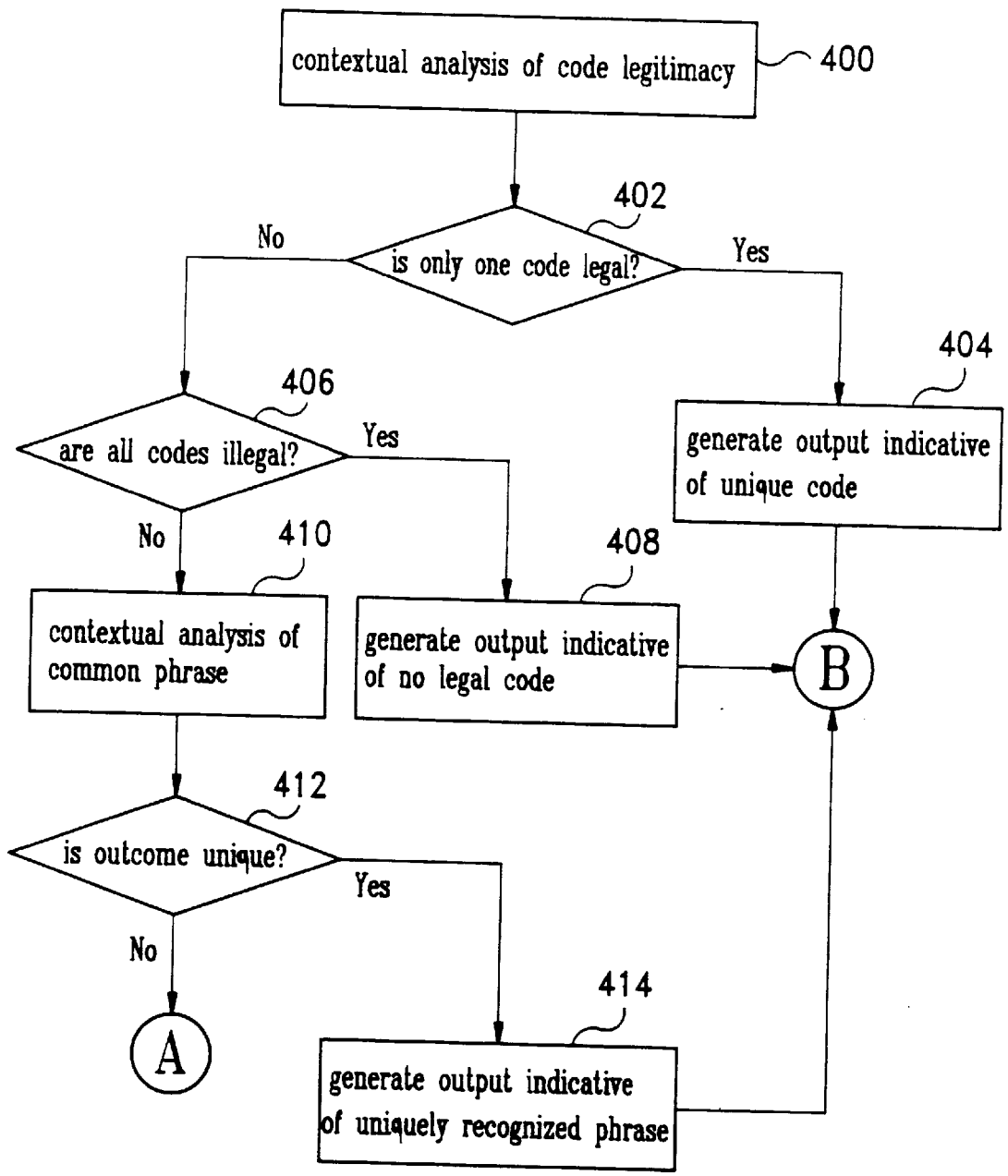
FIGS. 5A and 5B show a detailed flow diagram of the text recognizer.
Figure 5B:
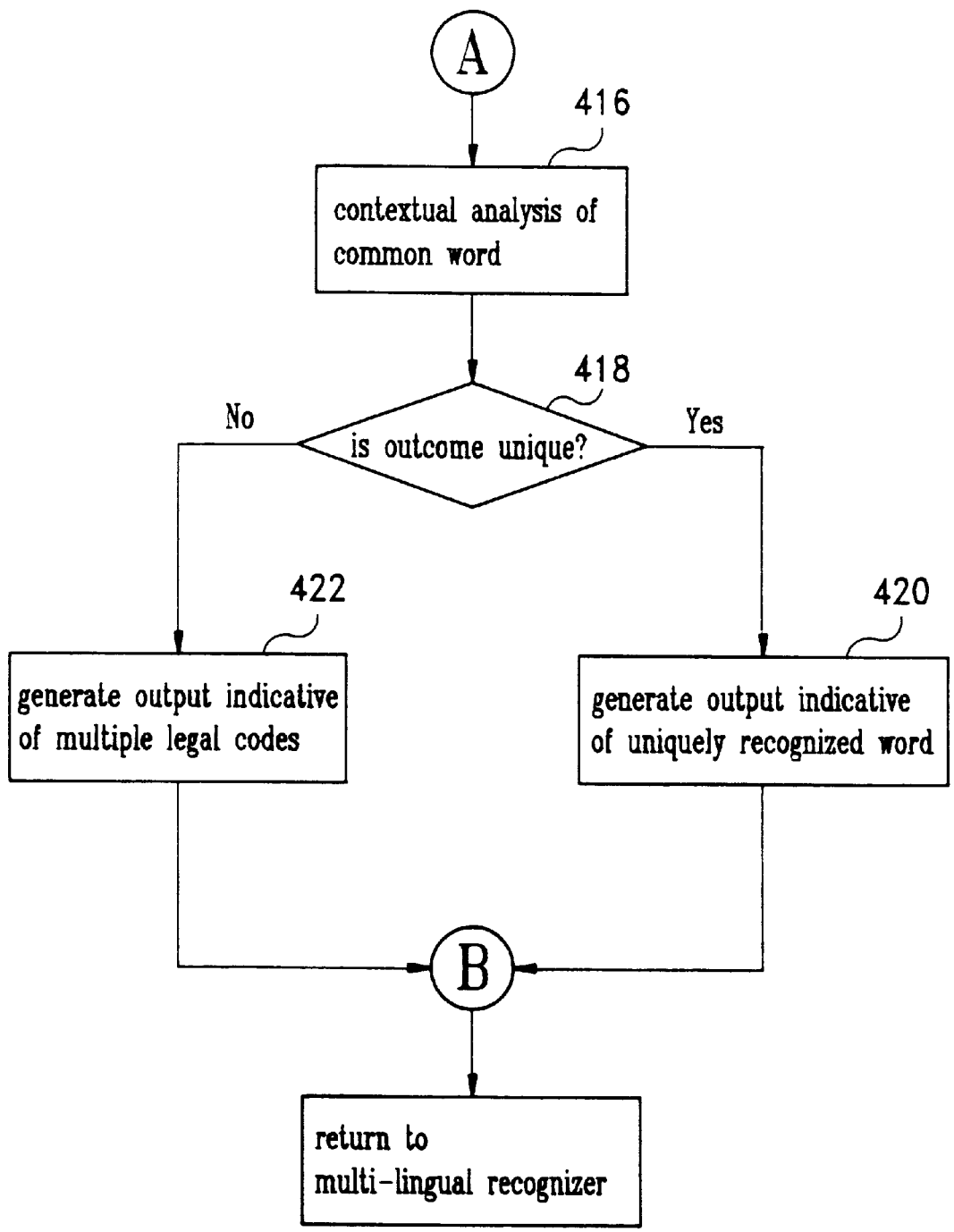

FIGS. 5A and 5B show a detailed flow diagram of the text recognizer 40. The text recognizer 40 performs contextual analysis of code legitimacy on the input characters of a whole text in step 400, where the whole text can be a whole paragraph or a whole article. In this embodiment, the code ranges of Big 5, GB 2312, Shift-Jis and KSC-5601 are consecutively compared with the code blocks of the input characters in order to determine the code legitimacy. The comparing method used in this embodiment is a conventional one. If only one code is recognized legal (step 402), this unique code is output in step 404, followed by returning to multi-lingual recognizer 20. If the answer in the step 402 is no, a further determination (in step 406) is made to decide whether all codes pertinent to the different characters are illegal. If all codes are illegal, an output indicative of no legitimacy is generated in step 408. If at least a portion of the processed characters is legal, the contextual analysis of common phrase is applied in step 410. In this embodiment, the contextual analysis of common phrase is performed by consecutively analyzing the input characters with the pre-stored Taiwanese common-phrase data base, the Chinese common-phrase data base, the Japanese common-phrase data base, and the Korean common-phrase data base. The method of this analysis is also a conventional one. After the contextual analysis of common phrase (step 410), a determination is made in step 412 to decide whether the processed phrase is uniquely recognized. If the decision is yes, the recognized code pertinent to the processed phrase is output (in step 414), followed by returning to the multi-lingual recognizer 20. If the decision in step 412 is no, the contextual analysis of common word is applied in step 416. In this embodiment, the contextual analysis of common word is performed by consecutively analyzing the input characters with the pre-stored Taiwanese common-word data base, the Chinese common-word data base, the Japanese common-word data base, and the Korean common-word data base. The method of this analysis is also a conventional one. After the contextual analysis of common word (step 416), a determination is made in step 418 to decide whether the processed word is uniquely recognized. If the decision is yes, the recognized code pertinent to the processed word is output (in step 420), followed by returning to the multi-lingual recognizer 20. If the decision in step 418 is no, an output indicative of multiple legal codes is generated in step 422, followed by returning to the multi-lingual recognizer 20.

According to the flow of the text recognizer 40 shown in FIGS. 5A and 5B, where the contextual analysis of code legitimacy, the contextual analysis of common phrase, and the contextual analysis of common word are consecutively used, there are three possible outcomes after returning back to the multi-lingual recognizer 20, i.e., a unique legal code, no legal code, and multiple legal codes. For the later two outcomes, the present-position recognizer 50 is then required to perform further analysis, and is described in detail in connection with FIGS. 6A and 6B.

Figure 6A:
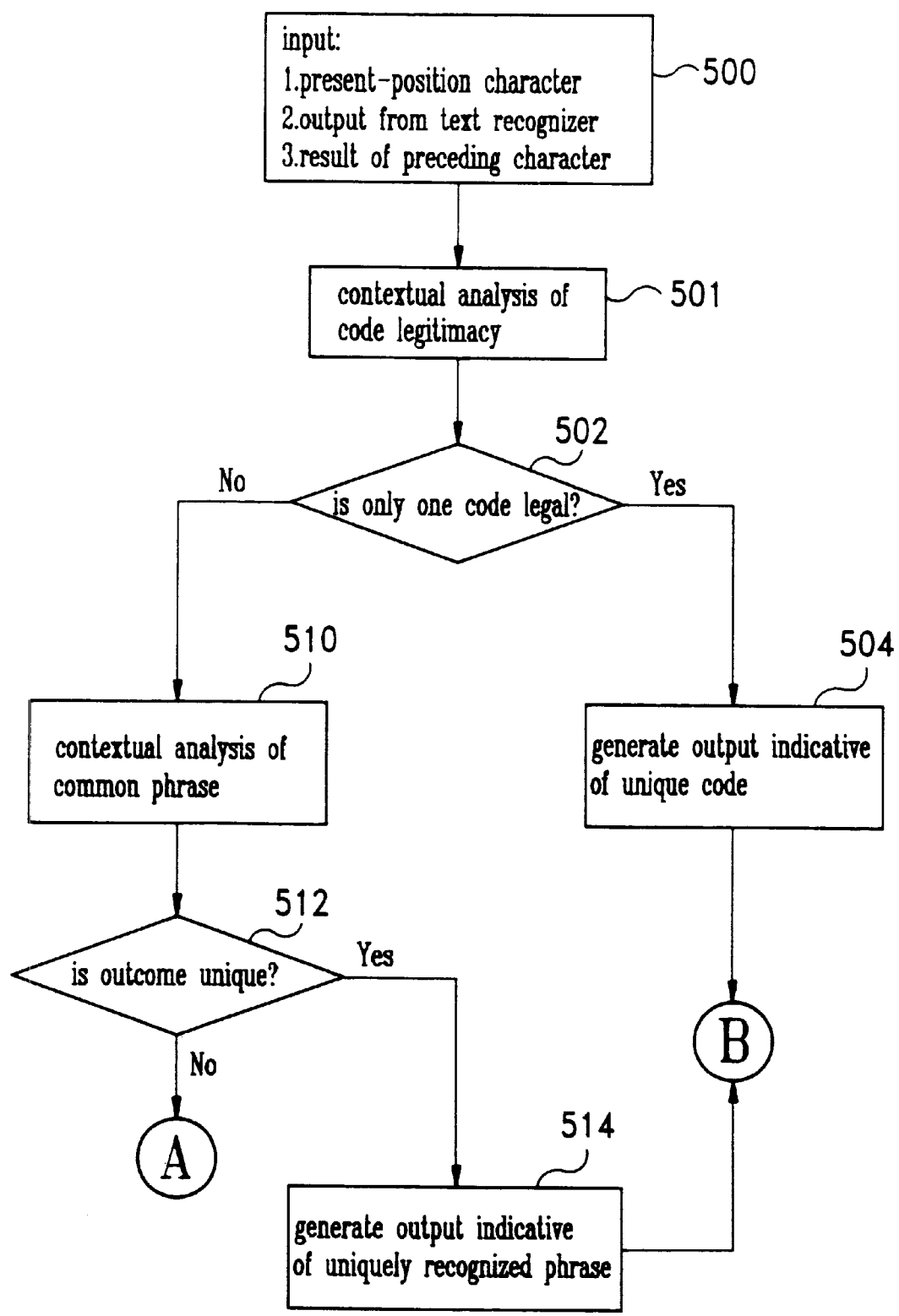
FIGS. 6A and 6B show a detailed flow diagram of the present-position recognizer.
Figure 6B:
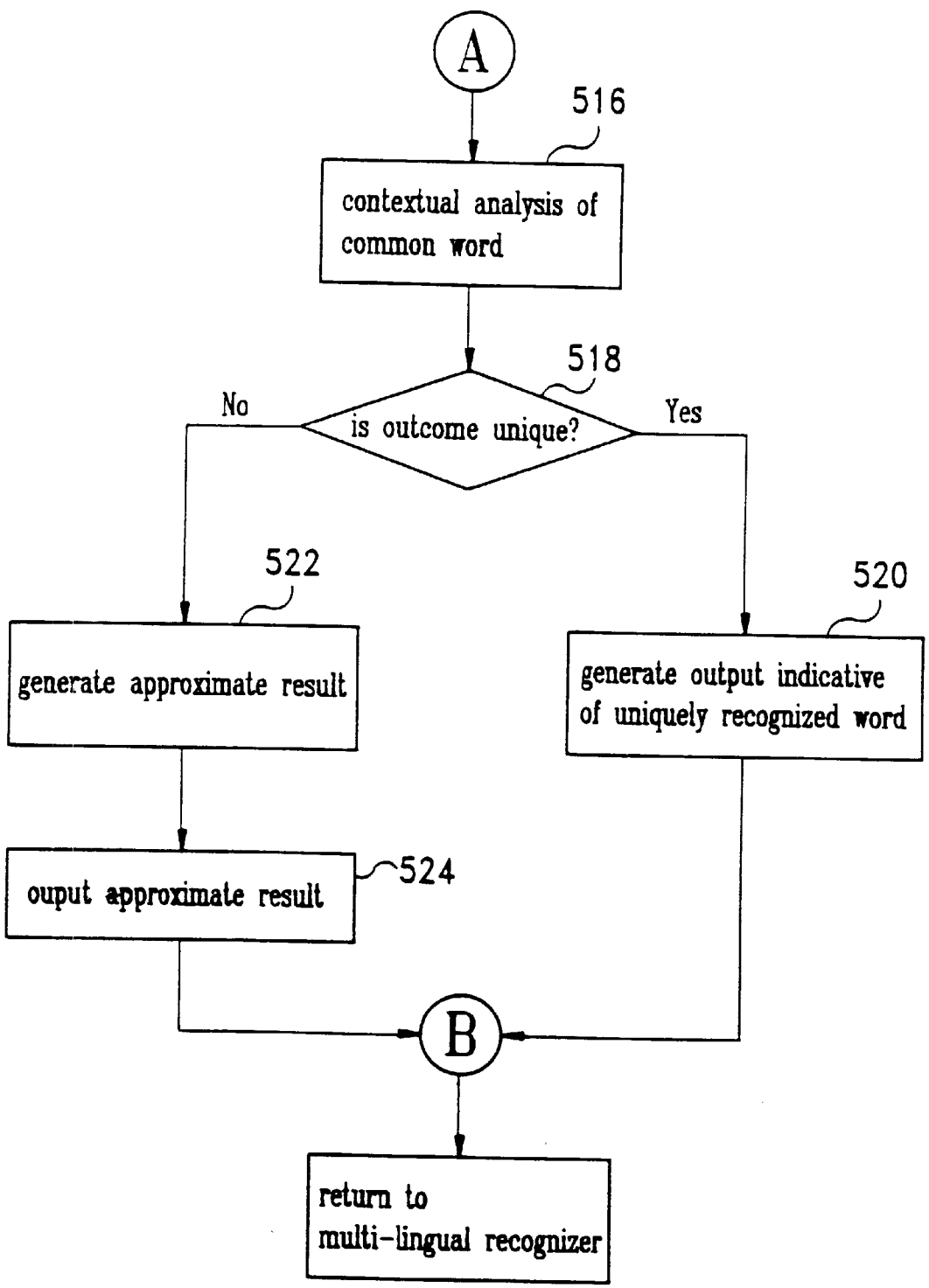

FIGS. 6A and 6B show a detailed flow diagram of the present-position recognizer 50. Firstly in step 500, present-position character, the output from the text recognizer 40, and the result of the preceding character are input. The present-position recognizer 50 performs contextual analysis of code legitimacy on the input character in step 501. In this embodiment, the code ranges of Big 5, GB 2312, Shift-Jis and KSC-5601 are consecutively compared with the code blocks of the input character in order to determine the code legitimacy. The comparing method used in this embodiment is a conventional one. If only one code is recognized legal (step 502), this unique code is output in step 504, followed by returning to multi-lingual recognizer 20. If the answer in the step 502 is no, the contextual analysis of common phrase is applied in step 510 to determine the code pertinent to the present-position character and the character followed. In this embodiment, the contextual analysis of common phrase is performed by consecutively analyzing the input characters with the pre-stored Taiwanese common-phrase data base, the Chinese common-phrase data base, the Japanese common-phrase data base, and the Korean common-phrase data base. The method of this analysis is also a conventional one. After the contextual analysis of common phrase (step 510), a determination is made in step 512 to decide whether the processed phrase is uniquely recognized. If the decision is yes, the recognized code pertinent to the processed phrase is output (in step 514), followed by returning to the multi-lingual recognizer 20. If the decision in step 512 is no, the contextual analysis of common word is applied in step 516.

In this embodiment, the contextual analysis of common word is performed by consecutively analyzing the input characters with the pre-stored Taiwanese common-word data base, the Chinese common-word data base, the Japanese common-word data base, and the Korean common-word data base. The method of this analysis is also a conventional one. After the contextual analysis of common word (step 516), a determination is made in step 518 to decide whether the processed word is uniquely recognized. If the decision is yes, the recognized code pertinent to the processed word is output (in step 520), followed by returning to the multi-lingual recognizer 20. If the decision in step 518 is no, an approximate result is generated in step 522 according to the results of the contextual analysis of common phrase/word, the text recognizer and the preceding character. One implementation of this approximation generating is done, for example, by estimating the percentage of each recognized code. More specifically, this approximate result is set to the code that has the largest percentage in the processed article. It is appreciated that other conventional statistic or mathematical methods can be adapted to obtain this approximate result. The approximate result is then output in step 524, followed by returning to the multi-lingual recognizer 20. FIG. 7 shows one example of the recognized multi-lingual article, which contains Korean, Chinese (in Big 5), Japanese, and Chinese (in GB 2312).

Although specific embodiments have been illustrated and described, it will be obvious to those skilled in the art that various modifications may be made without departing from the spirit which is intended to be limited solely by the appended claims.

What is claimed is:

1. A multi-lingual recognizing method using contextual information for automatically recognizing codes of multi-lingual characters, and correctly displaying the multi-lingual characters, said method comprising:

determining code legitimacy of a plurality of characters of a text by comparing code blocks of said plurality of characters with predefined code ranges of a plurality of code systems;

analyzing said plurality of characters of the text to determine whether said plurality of characters are common phrases by comparing said plurality of characters with a plurality of common-phrase data bases, when the code legitimacy of said plurality of characters is not uniquely recognized;

analyzing said plurality of characters of the text to determine whether said plurality of characters are common words by comparing said plurality of characters with a plurality of common-word data bases, when the analysis of the common phrase of said plurality of characters is not uniquely recognized;

determining code legitimacy of a present-position character of said plurality of characters by comparing code block of said present-position character with predefined code ranges of said plurality of code systems, when the analysis of the common word of said plurality of characters in not uniquely recognized;

analyzing said present-position character and at least one character thereafter to determine whether said present-position character and said at least one character thereafter together is the common phrase by comparing said present-position character and said at least one character thereafter with the plurality of common-phrase data bases, when the code legitimacy of said present-position character is not uniquely recognized; and analyzing said present-position character to determine whether said present-position character is the common word by comparing said present-position character with the plurality of common-word data bases, when the analysis of the common phrase of said present-position character is not uniquely recognized.

2. The method according to claim 1, wherein said code systems comprise Big 5, GB 2312, Shift-Jis, and KSC-5601.

3. The method according to claim 1, wherein said common-phrase data bases comprise Taiwanese common-phrase data base, Chinese common-phrase data base, Japanese common-phrase data base, and Korean common-phrase data base.

4. The method according to claim 1, wherein said common-word data bases comprise Taiwanese common-word data base, Chinese common-word data base, Japanese common-word data base, and Korean common-word data base.

5. The method according to claim 1, wherein said determination step of the code legitimacy of said present-position character receives the present-position character, an output from the analysis step of the common word, and an output from a character preceding the present-position character.

6. The method according to claim 1, wherein after said analysis step of the common word of said plurality of characters of the text, one outcome of the following is generated: a code is uniquely determined, no code is determined, and multiple codes are determined.

7. A multi-lingual recognizing method using contextual information for automatically recognizing codes of multi-lingual characters, and correctly displaying the multi-lingual characters, said method comprising:

determining code legitimacy of a plurality of characters of a text by comparing code blocks of said plurality of characters with predefined code ranges of a plurality of code systems;

analyzing said plurality of characters of the text to determine whether said plurality of characters are common phrases by comparing said plurality of characters with a plurality of common-phrase data bases, when the code legitimacy of said plurality of characters is not uniquely recognized; and analyzing said plurality of characters of the text to determine whether said plurality of characters are common words by comparing said plurality of characters with a plurality of common-word data bases, when the analysis of the common phrase of said plurality of characters is not uniquely recognized.

8. The method according to claim 7, further comprising:

determining code legitimacy of a present-position character of said plurality of characters by comparing code block of said present-position character with predefined code ranges of said plurality of code systems, when the analysis of the common word of said plurality of characters in not uniquely recognized;

analyzing said present-position character and at least one character thereafter to determine whether said present-position character and said at least one character thereafter are common phrases by comparing said present-position character and said at least one character thereafter with the plurality of common-phrase data bases, when the code legitimacy of said present-position character is not uniquely recognized; and analyzing said present-position to determine whether said present-position character is common word by comparing said present-position character with the plurality of common-word data bases, when the analysis of the common phrase of said present-position character is not uniquely recognized.

9. The method according to claim 8, wherein said code systems comprise Big 5, GB 2312, Shift-Jis, and KSC-5601.

10. The method according to claim 8, wherein said common-phrase data bases comprise Taiwanese common-phrase data base, Chinese common-phrase data base, Japanese common-phrase data base, and Korean common-phrase data base.

11. The method according to claim 8, wherein said common-word data bases comprise Taiwanese common-word data base, Chinese common-word data base, Japanese common-word data base, and Korean common-word data base.

12. The method according to claim 8, wherein said determination step of the code legitimacy of said present-position character receives the present-position character, an output from the analysis step of the common word, and an output from a character preceding the present-position character.

13. The method according to claim 7, wherein after said analysis step of the common word of said plurality of characters of the text, one outcome of the following is generated: a code is uniquely determined, no code is determined, and multiple codes are determined.

\* \* \* \* \*